United States Patent
Tamiya

(10) Patent No.: US 8,949,372 B2
(45) Date of Patent: Feb. 3, 2015

(54) TRANSMISSION APPARATUS AND TRANSMISSION METHOD

(75) Inventor: Keisuke Tamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 13/305,328

(22) Filed: Nov. 28, 2011

(65) Prior Publication Data

US 2012/0158896 A1 Jun. 21, 2012

(30) Foreign Application Priority Data

Dec. 17, 2010 (JP) .................. 2010-282398
Nov. 17, 2011 (JP) .................. 2011-251919

(51) Int. Cl.
*G06F 15/16* (2006.01)
*H04N 19/12* (2014.01)

(52) U.S. Cl.
CPC ............... *H04N 19/00078* (2013.01)
USPC ........................................ 709/217

(58) Field of Classification Search
None
See application file for complete search history.

(56) References Cited

U.S. PATENT DOCUMENTS

| | | | | |
|---|---|---|---|---|
| 2002/0056010 A1* | 5/2002 | Lincoln et al. | ................. | 709/247 |
| 2002/0143972 A1* | 10/2002 | Christopoulos et al. | ...... | 709/231 |
| 2004/0073710 A1* | 4/2004 | Fallon | ............................ | 709/247 |
| 2004/0210948 A1* | 10/2004 | Jin et al. | ........................ | 725/145 |
| 2005/0114513 A1* | 5/2005 | Dorenbosch et al. | .......... | 709/227 |
| 2005/0188112 A1* | 8/2005 | Desai et al. | .................... | 709/247 |

FOREIGN PATENT DOCUMENTS

JP  2001-204001 A  7/2001

* cited by examiner

*Primary Examiner* — Mohamed Wasel
*Assistant Examiner* — Tsung Wu
(74) *Attorney, Agent, or Firm* — Fitzpatrick, Cella, Harper & Scinto

(57) ABSTRACT

A request message containing a first description defining a portion to be extracted from multimedia data and a second description defining a scheme for extracting the portion is received from a data reception apparatus. The portion defined by the first description is extracted as partial data from the multimedia data. A coefficient corresponding to the scheme defined by the second description is acquired. Whether a value corresponding to the acquired coefficient is larger than a threshold is determined. If the value is larger than the threshold, the partial data is compressed, and compressed data obtained by the compression is transmitted to the data reception apparatus. If the value is equal to or smaller than the threshold, the partial data is transmitted to the data reception apparatus.

10 Claims, 10 Drawing Sheets

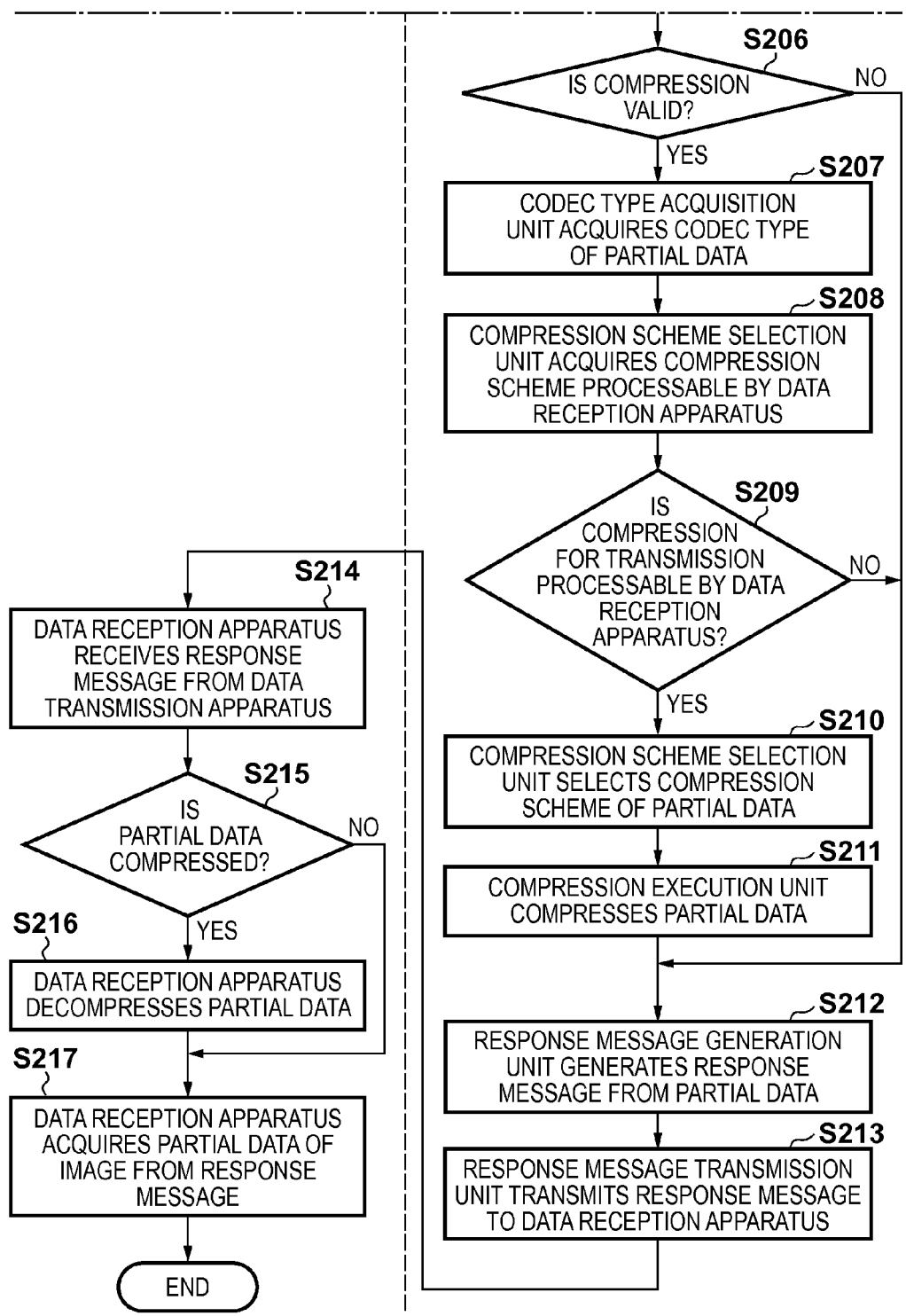

FIG. 3

| CODEC TYPE | COMPRESSION SCHEME |
|---|---|
| tx3g | deflate,gzip |
| mp4v | identity |
| mp4a | identity |
| H264 | identity |
| ... | ... |

301, 302

FIG. 4 http://www.example.com/example.mp4#t=10,20 — 401
http://www.example.com/example.mp4#xywh=50,80,320,240 — 402
http://www.example.com/example.mp4#track=subtitle — 403
http://www.example.com/example.mp4#track=subtitle&t=10,20 — 404

FIG. 5A

```
GET/example.mp4 HTTP/1.1
Host:www.example.com
Accept-Encoding:deflate
Range:track=subtitle
```

FIG. 5B

```
HTTP/1.1 206 Partial Content
Content-Type:video/mp4
Content-Range-Mapping:track=subtitle
Content-Encoding:deflate
…
deflate COMPRESSED SUBTITLE TRACK DATA
```

FIG. 6

| DATA SPLITTING SCHEME | COEFFICIENT OF COMPRESSION VALIDNESS |
|---|---|
| temporal | 0 |
| spatial | 0 |
| track | 1 |
| … | … |

FIG. 7

| CODEC TYPE | PREFERENTIAL COMPRESSION SCHEME | NORMAL COMPRESSION SCHEME |
|---|---|---|
| tx3g | exi | deflate,gzip |
| mp4v | - | deflate,gzip |
| mp4a | - | identity |
| H264 | - | identity |
| ... | ... | ... |

```
GET/example.mp4 HTTP/1.1
Host:www.example.com
X-Accept-Encoding:exi,finf,deflate
Range:track=subtitle
```

FIG. 8B

```
HTTP/1.1 206 Partial Content
Content-Type:video/mp4
Content-Range-Mapping:track=subtitle
X-Content-Encoding:exi
...
EXI COMPRESSED SUBTITLE TRACK DATA
```

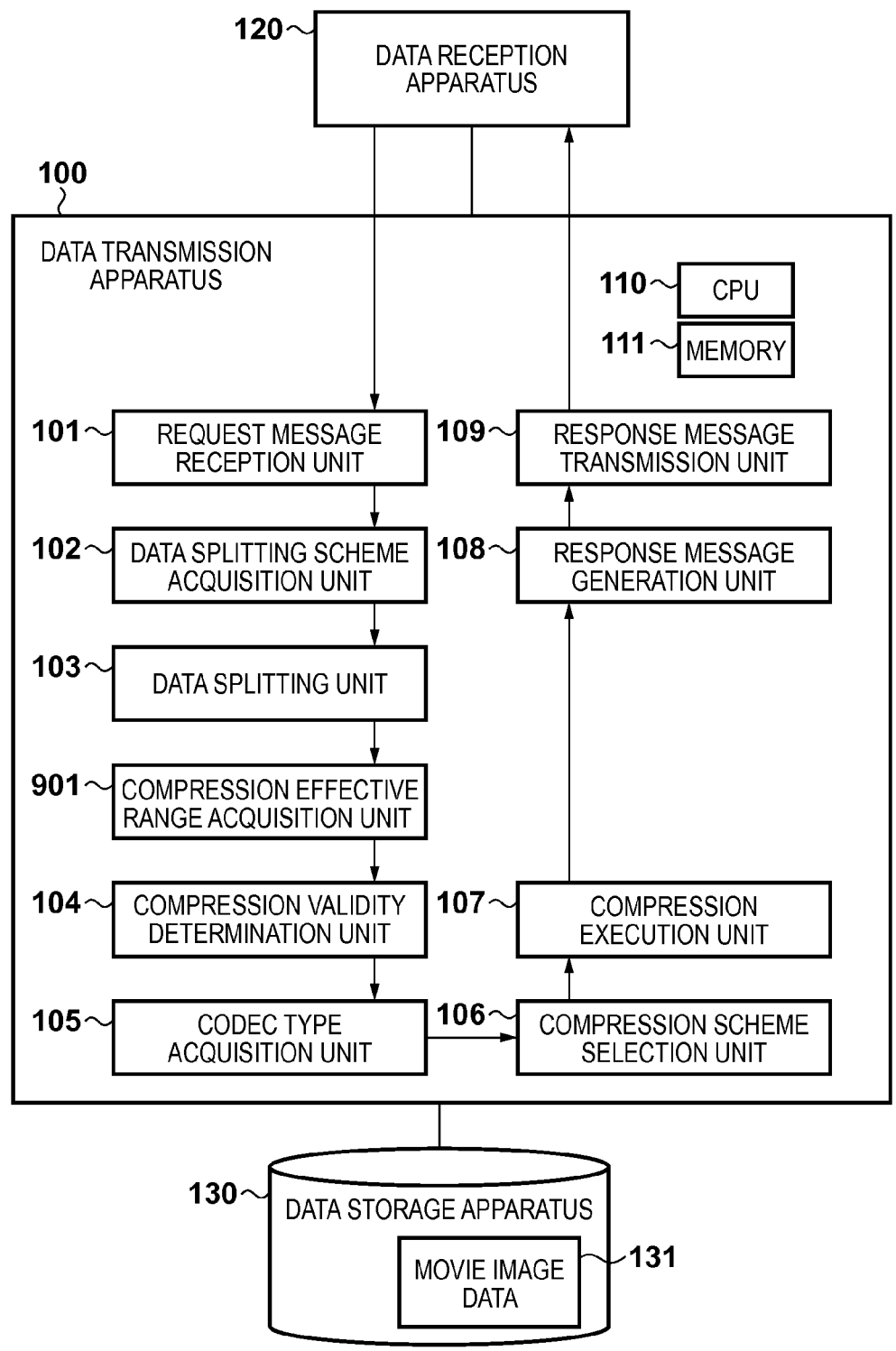

FIG. 11

| 1101 | 1102 |
|---|---|
| COMPRESSION VALIDNESS | COMPRESSION LEVEL |
| 0 MB | 0 (NO COMPRESSION) |
| LESS THAN 10 MB | 4 |
| 10 MB OR MORE | 9 |

TRANSMISSION APPARATUS AND TRANSMISSION METHOD

BACKGROUND OF THE INVENTION

1. Field of the Invention

The present invention relates to a multimedia data transmission technique.

2. Description of the Related Art

Conventionally, a description method called a URI for identifying resources such as files on a network is defined by the specifications of RFC3986 disclosed by IETF. According to the specifications, the user of the URI can express a secondary resource such as partial data of a main resource by adding a description called a fragment identifier to a portion of the URI.

In addition, W3C is defining the specifications of a media fragment URI for expressing data obtained by splitting multimedia data such as a movie in accordance with the time, coordinates, and track type (for example, an image, sound, or subtitle) by using the fragment identifier.

According to the specifications, when acquiring a movie from a movie distribution apparatus, a movie reproduction terminal apparatus as described in Japanese Patent Laid-Open No. 2001-204001 can designate a part of the movie as an acquisition target by using the URI containing the fragment identifier.

When a resource as an acquisition target exists on a Web server, HTTP/1.1 whose specifications are disclosed by RFC2068 is often used as a communication protocol. HTTP/1.1 defines an HTTP compression encoding scheme, and can suppress the network load by decreasing the data size by compressing a resource having a compression effect. Note that the specifications of the HTTP compression encoding scheme define the use of compression schemes such as "deflate", "compress", and "gzip".

In a Web system including a Web server holding movie data and a network terminal that uses moving data, the terminal sometimes uses only partial data of a movie such as a subtitle track.

For example, the terminal selects or excludes a movie including a specific keyword in a subtitle from a plurality of movies on the Web server, or presents the start portion of a subtitle of each movie as an index to the user.

As a simple method of implementing these uses, it is possible to allow the terminal to acquire all movie data from the Web server, and separate the necessary data portion such as a subtitle track by an application called a splitter corresponding to the format of each movie data.

Unfortunately, when the storage capacity for storing the whole movie data is small or the resources such as the computability for operating a plurality of splitters are little, for example, when the terminal is a small apparatus, the processing speed decreases when implementing the above-mentioned uses.

On the other hand, the Web server often has more resources than those of the terminal, the problem of the processing speed as described above can be solved by using a method by which the terminal requests the Web server for partial data of a movie, and the Web server splits the data. A procedure of performing this method is that the terminal notifies the Web server of a necessary data range by using a description method such as the media fragment URI, and acquires the corresponding partial data from the Web server. In this procedure, the Web server transmits the partial data requested by the terminal as data having the same media type as that of the unsplit movie data.

Since movie data is generally already compressed, the compression effect in transmission is small, so data having the media type of movie data is transmitted without HTTP compression. However, many movie data such as MPEG-4 file data have a container form including a plurality of tracks. When movie data like this is split in accordance with the track type, partial data sometimes has a compression effect.

When transmitting partial data from the Web server, however, the data is transmitted as it is uncompressed regardless of its compression effect. This makes the network load impossible to reduce.

SUMMARY OF THE INVENTION

The present invention has been made in consideration of the above problem, and provides a technique for acquiring partial data of a container type resource stored in an external apparatus, by using a compression scheme suited to the partial data.

According to the first aspect of the present invention, a transmission apparatus for transmitting data requested by an external apparatus to the external apparatus, comprising: a holding unit which holds, for each scheme of extracting partial data from multimedia data, a coefficient indicating compression validness for data to be extracted by the scheme; a reception unit which receives, from the external apparatus, a request message containing a first description defining a portion to be extracted from the multimedia data, and a second description defining a scheme of extracting the portion; an extraction unit which extracts, from the multimedia data, the portion defined by the first description as partial data; an acquisition unit which acquires, from the holding unit, a coefficient corresponding to the scheme defined by the second description; and a transmission unit which controls whether to compress the partial data in accordance with a value corresponding to the coefficient acquired by the acquisition unit, and transmits one of the compressed partial data and uncompressed partial data obtained by the control to the external apparatus.

According to the second aspect of the present invention, a transmission method performed by a transmission apparatus which transmits data requested by an external apparatus to the external apparatus, and comprises a holding unit which holds, for each scheme of extracting partial data from multimedia data, a coefficient indicating compression validness for the data to be extracted by the scheme, comprising: a step of causing a reception unit of the transmission apparatus to receive, from the external apparatus, a request message containing a first description defining a portion to be extracted from the multimedia data, and a second description defining a scheme of extracting the portion; a step of causing an extraction unit of the transmission apparatus to extract, from the multimedia data, the portion defined by the first description as partial data; an acquisition step of causing an acquisition unit of the transmission apparatus to acquire, from the holding unit, a coefficient corresponding to the scheme defined by the second description; and a transmission step of causing a transmission unit of the transmission apparatus to control whether to compress the partial data in accordance with a value corresponding to the coefficient acquired by the acquisition unit, and transmit one of the compressed partial data and uncompressed partial data obtained by the control to the external apparatus.

Further features of the present invention will become apparent from the following description of exemplary embodiments with reference to the attached drawings.

BRIEF DESCRIPTION OF THE DRAWINGS

FIGS. 2A and 2B are flowcharts of processing performed by a data reception apparatus 120 and data transmission apparatus 100;

FIG. 3 is a view showing the correspondence between the codec type and compression scheme;

FIG. 4 is a view showing four examples each describing a URI by the media fragment URI format of W3C;

FIGS. 5A and 5B are views showing configuration examples of a request message and response message;

FIG. 6 is a view showing the correspondence between the splitting scheme and coefficient;

FIG. 7 is a view showing the correspondence between the codec type, preferential compression scheme, and HTTP standard compression scheme;

FIGS. 8A and 8B are views showing configuration examples of a request message and response message;

FIG. 9 is a block diagram showing a functional configuration example of a system of the third embodiment;

FIG. 11 is a view showing an example of a compression level correspondence table used in the fourth embodiment.

DESCRIPTION OF THE EMBODIMENTS

Figure 1:
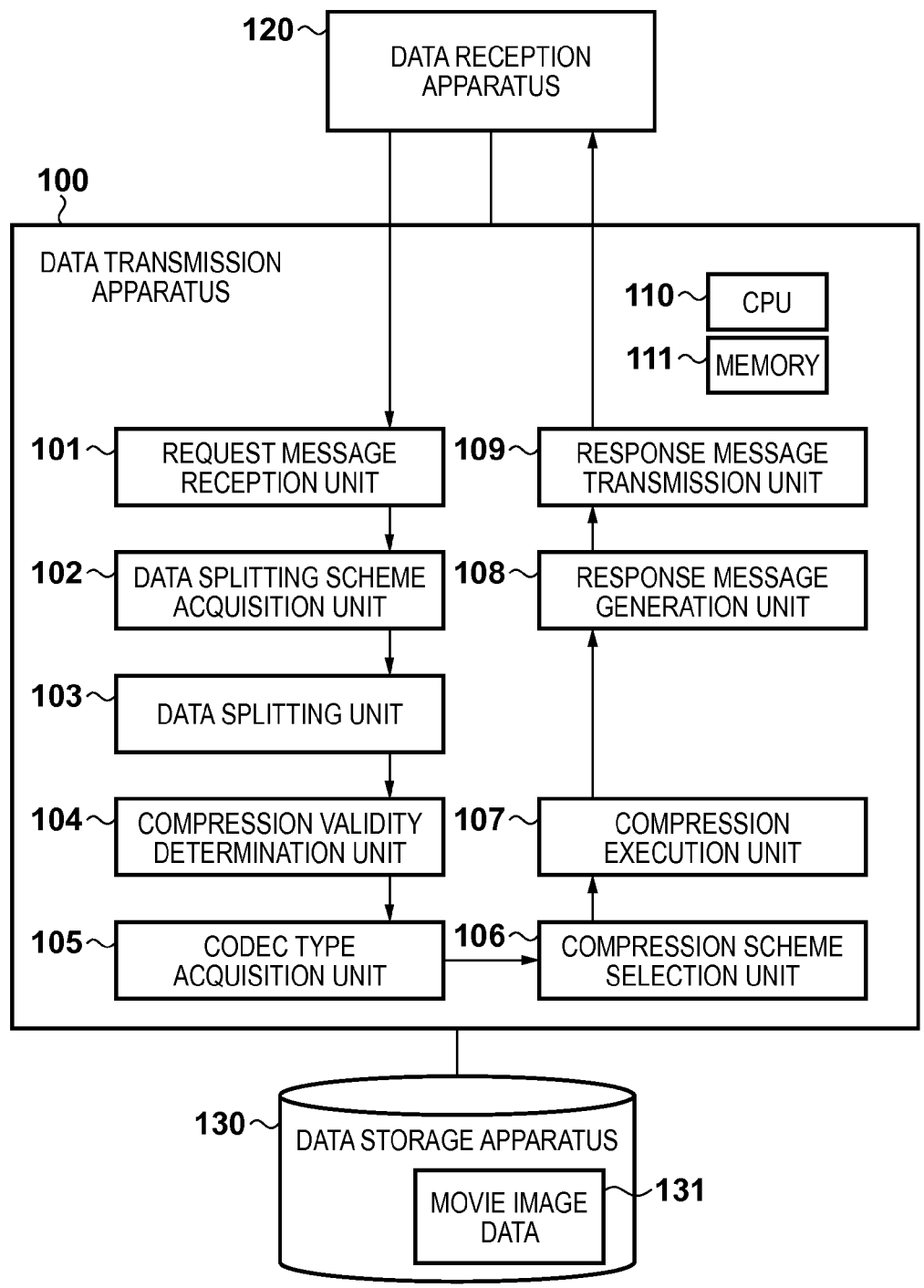
FIG. 1 is a block diagram showing a functional configuration example of a system.

Embodiments of the present invention will be explained below with reference to the accompanying drawings. Note that each embodiment to be explained below shows an example when the present invention is practically carried out, and is a practical example of the configurations described in the scope of the appended claims.

[First Embodiment]

First, a system including a transmission apparatus according to this embodiment will be explained with reference to a block diagram shown in FIG. 1. A data transmission apparatus 100 and data reception apparatus 120 are connected to a network such as a LAN or the Internet, and can communicate data with each other across the network. In addition, the data transmission apparatus 100 is connected to a data storage apparatus 130 holding movie image data 131 as an example of multimedia data. Note that the data storage apparatus 130 is separated from the data transmission apparatus 100 in FIG. 1, but the data storage apparatus 130 may also be integrated with the data transmission apparatus 100. Note also that the movie image data 131 is used as an example of multimedia data in this embodiment, but another data may also be used as multimedia data.

Next, the data transmission apparatus 100 will be explained. A CPU 110 controls the operation of the whole data transmission apparatus 100. A memory 111 can provide various areas such as a work area that the CPU 110 uses to execute various processes.

Of the parts forming the data transmission apparatus 100 shown in FIG. 1, parts except for the CPU 110 and memory 111 can be formed by either hardware or software (computer programs). When forming these parts by software, the software is stored in an internal memory (not shown) of the data transmission apparatus 100, and the CPU 110 reads out the software to the memory 111 and executes the readout software. Note that the operations of the parts, except for the CPU 110 and memory 111 of the parts forming the data transmission apparatus 100 shown in FIG. 1, will be explained below with reference to flowcharts shown in FIGS. 2A and 2B.

Figure 2A:
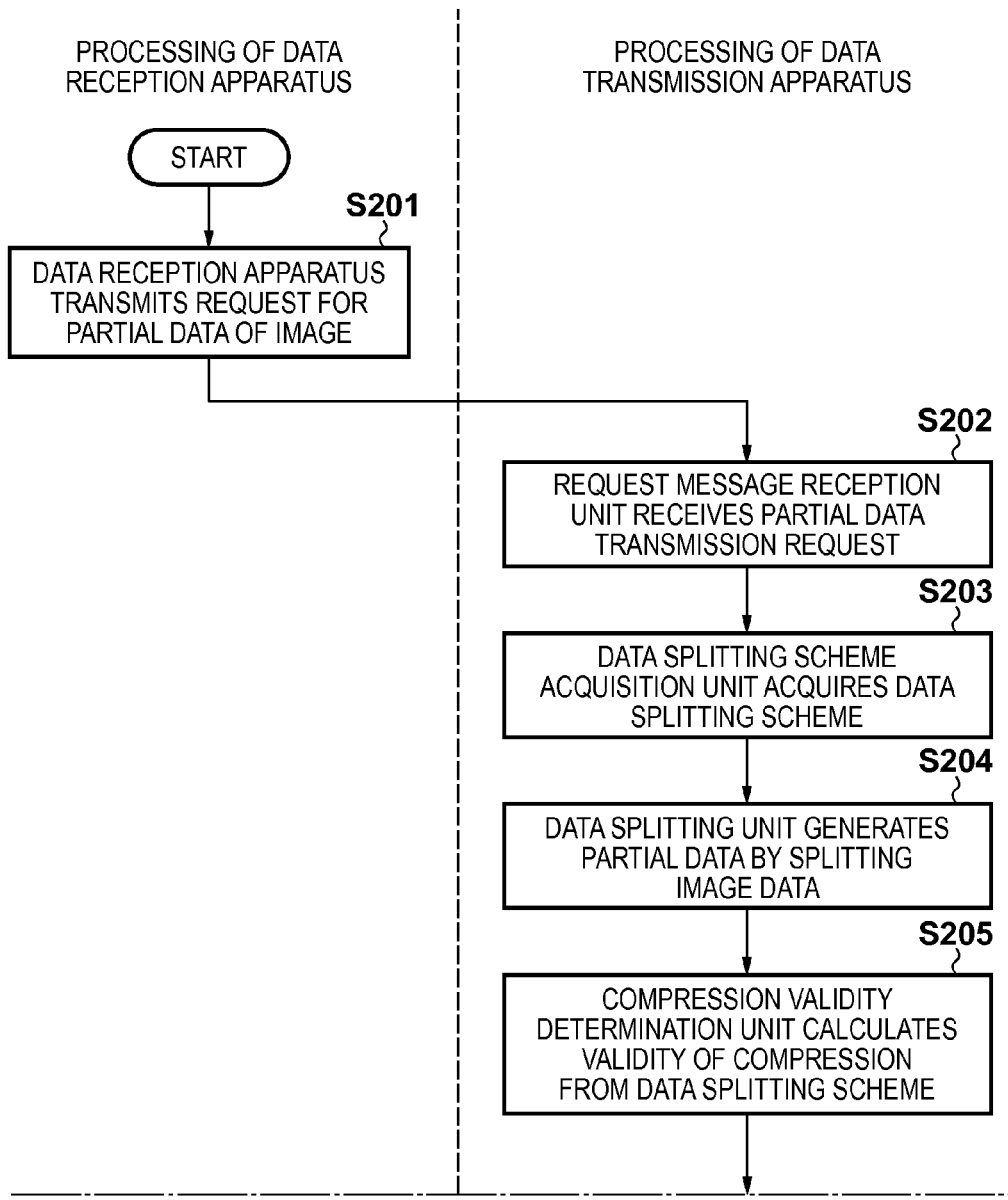

Processing performed by the data reception apparatus 120 and data transmission apparatus 100 will be explained with reference to the flowcharts shown in FIGS. 2A and 2B. Note that in the following explanation, the parts except for the CPU 110 and memory 111 of the parts forming the data transmission apparatus 100 shown in FIG. 1 are the main parts of the operation. When these parts are formed by software, however, the CPU 110 executes the software. In this case, therefore, the CPU 110 is the main part. These parts can of course be the main parts when they are formed by hardware.

In step S201, the data reception apparatus 120 forms a request message indicating an acquisition request for data (partial data) of a portion of the movie image data 131, and transmits the message to the data transmission apparatus 100 across the above-mentioned network. For example, a Web browser is displayed on the display screen of the data reception apparatus 120, and a transmission instruction is input by inputting the URI of the partial data on this Web browser.

FIG. 4 shows four examples in each of which the URI of the partial data is described by the media fragment URI format of W3C. Each URI includes a first description defining a portion to be extracted from a movie image (file name "example.mp4") on www.example.com, and a second description defining a scheme of extracting this portion.

A URI 401 defines that when the reproduction start time is 0 sec in this movie image, a portion from a reproduction time of 10 sec to a reproduction time of 20 sec is an extraction target, and also defines that a "temporal" splitting scheme is used as a scheme of extracting this portion from the movie image.

A URI 402 defines that when (x,y)=(50,80) is the start point in the movie image, a region having 320 pixels as a width and 240 pixels as a height is an extraction target, and also defines that a "spatial" splitting scheme is used as a scheme of extracting this region from the movie image.

A URI 403 defines that a subtitle track portion in the movie image is an extraction target, and also defines that a "track" splitting scheme is used as a scheme of extracting this subtitle track portion from the movie image.

A URI 404 defines that when the reproduction start time is 0 sec in the movie image, a portion from a reproduction time of 10 sec to a reproduction time of 20 sec is an extraction target, and also defines that the "temporal" splitting scheme and "track" splitting scheme are used as schemes of extracting this portion from the movie image.

FIG. 5A shows a configuration example of the request message when requesting the media fragment URI represented by the URI 403 by using the HTTP. This request message describes that a subtitle track portion in a movie image (file name "example.mp4") on www.example.com is requested by the GET method of HTTP1.1. This request message also describes that data compressed by a "deflate" scheme can be received.

Referring to FIG. 2A again, in step S202, a request message reception unit 101 receives the request message transmitted from the data reception apparatus 120 (an external apparatus). In step S203, a data splitting scheme acquisition unit 102 refers to the data splitting scheme described in the request message acquired in step S202. For example, if the request message shown in FIG. 5A is received in step S202, the value of the "Range" header of the HTTP has description "track=subtitle". Therefore, the data splitting scheme acquisition unit 102 refers to this description, and determines that the data splitting scheme is "track" based on the specifications of the media fragment URI.

In step S204, a data splitting unit 103 refers to the file name of multimedia data described in the request message acquired in step S202, and reads out multimedia data having this file name from the data storage apparatus 130.

For example, if the request message shown in FIG. 5A is received in step S202, "example.mp4" is described as the file name of multimedia data, so multimedia data having this file name is read out from the data storage apparatus 130. The explanation will be made hereinafter by assuming that the multimedia data whose file name is "example.mp4" is the movie image data 131.

Then, the data splitting unit 103 extracts (splits), as partial data, the portion defined as an extraction target in the request message from the readout movie image data 131. For example, if the request message shown in FIG. 5A is received in step S202, it is determined in step S203 that the splitting scheme is "track", so a subtitle track portion is extracted as partial data from the movie image data 131.

Note that the technique of extracting (splitting) partial data from the movie image data 131 is already implemented by a function included in a general movie decoder for each movie format, for example, a program called a splitter, so a detailed explanation of the technique will be omitted.

In step S205, a compression validity determination unit 104 obtains the compression validness of the data splitting scheme, as a value functioning as an index for determining whether the partial data extracted in step S204 is obtained by a splitting scheme having a compression effect (whether there is compression validity).

In this embodiment, as shown in FIG. 6, the compression validity determination unit 104 holds a table in which a coefficient indicating the validness of compression for data extracted by each splitting scheme is registered for the splitting scheme.

Referring to FIG. 6, splitting scheme names such as "temporal", "spatial", and "track" are described in a field 601. In a field 602, the values of coefficients corresponding to the individual splitting schemes described in the field 601 are described. For example, the value of a coefficient corresponding to the splitting scheme "temporal" is "0".

In step S205, therefore, the compression validity determination unit 104 acquires, from the table shown in FIG. 6, a coefficient corresponding to each of all (two or more) splitting schemes referred to in step S203. After that, the compression validity determination unit 104 calculates, as the above-mentioned data splitting scheme compression validness, a summation ($\Sigma$) of products of the acquired coefficients and Boolean values each representing the presence/absence of the use of each splitting scheme. The Boolean value is 1 when the scheme is used, and 0 when the scheme is not used. For example, when the URI 404 shown in FIG. 4 is described as the media fragment URI, the compression validness of the data splitting scheme is 1 according to Compression validness of data splitting scheme=$\Sigma$
((coefficient of splitting scheme)×(Boolean value representing presence/absence of use of splitting scheme)

=(coefficient of "temporal" splitting scheme)×(Boolean value representing presence/absence of use of "temporal" splitting scheme)

+(coefficient of "spatial" splitting scheme)×(Boolean value representing presence/absence of use of "spatial" splitting scheme)

+(coefficient of "track" splitting scheme)×(Boolean value representing presence/absence of use of "track" splitting scheme)

=0×1+0×0+1×1=1

In step S206, the compression validity determination unit 104 determines whether the data splitting scheme compression validness obtained in step S205 is larger than a threshold. In this embodiment, threshold=0. If it is determined that the data splitting scheme compression validness obtained in step S205 is larger than the threshold, the compression validity determination unit 104 determines that the partial data extracted in step S204 is obtained by a splitting scheme having a compression effect, and advances the process to step S207. On the other hand, if the data splitting scheme compression validness obtained in step S205 is equal to or smaller than the threshold, the compression validity determination unit 104 determines that the partial data extracted in step S204 is obtained by a splitting scheme having no compression effect, and advances the process to step S212.

In step S207, a codec type acquisition unit 105 acquires the codec type of the partial data extracted in step S204. In this embodiment, the codec type of the partial data is determined by referring to a codec identifier called "FourCC" contained in the movie image data 131. However, the codec type may also be determined by another method depending on the format of the movie image data 131.

For example, if the request message shown in FIG. 5A is received in step S202, this request message describes that the "FourCC" identifier of the subtitle track portion in "example.mp4" as the movie image data 131 is "tx3g". Therefore, the codec type acquisition unit 105 refers to this portion, and determines that the codec type of the subtitle track portion has the 3GPP Timed Text format.

In step S208, a compression scheme selection unit 106 determines a compression scheme processable by the data reception apparatus 120. For example, if the request message shown in FIG. 5A is received in step S202, the compression scheme selection unit 106 refers to the value (a third description) of "Accept-Encoding" as the HTTP header of this request message. Then, the compression scheme selection unit 106 determines that the data reception apparatus 120 can process the "deflate" compression scheme.

Note that if a compression scheme processable by the data reception apparatus 120 is described in the request message, the process advances to step S210 via step S209; if not, the process advances to step S212 via step S209.

In step S210, the compression scheme selection unit 106 selects a compression scheme suited to the codec type (identifier) acquired in step S207, from compression schemes processable by the data reception apparatus 120. As shown in FIG. 3, the compression scheme selection unit 106 holds a table registering a compression scheme suitable for each codec type. Note that in FIG. 3, the above-described "FourCC" identifier is used as the value of the codec type, and "deflate", "gzip", and "identity (no compression)" that can be designated by "Accept-Encoding" of the HTTP are used as the values of the compression scheme.

Referring to FIG. 3, various codec types (identifiers) are registered in a field 301, and compression schemes fitted to these codec schemes are registered in a field 302. For example, according to the table shown in FIG. 3, when the codec type is "tx3g", a suitable (preset) compression scheme is "deflate" or "gzip". Therefore, the compression scheme selection unit 106 refers to the table shown in FIG. 3, and selects a compression scheme processable by the data reception apparatus 120, from compression schemes corresponding to the codec type acquired in step S207. That is, the compression scheme selection unit 106 selects a compression scheme common to compression schemes corresponding to the codec type acquired in step S207, and compression schemes processable by the data reception apparatus 120.

For example, if the request message shown in FIG. 5A is received in step S202, the codec type of the subtitle track portion is "tx3g", so the compression scheme selection unit 106 selects the compression schemes "deflate" and "gzip" corresponding to "tx3g" from the table shown in FIG. 3. Then, since the data reception apparatus 120 can process the "deflate" scheme, the compression scheme selection unit 106 selects the compression scheme "deflate" as a compression scheme for transmission, from the selected compression schemes "deflate" and "gzip".

In step S211, a compression execution unit 107 compresses the partial data extracted in step S204 in accordance with the compression scheme selected as a compression scheme for transmission in step S210, thereby generating compressed data.

In step S212, a response message generation unit 108 generates a response message. If the process advances from step S211 to step S212, the response message generation unit 108 generates, in step S212, a response message for the HTTP, which contains the compressed data generated in step S211, as shown in FIG. 5B.

A "Content-Range-Mapping" header is a header proposed by the specifications of the media fragment URI, and indicates that the data contained in the response message is a portion of the movie image data 131 split by the "track" splitting scheme. Also, a "Content-Encoding" header indicates that HTTP compression is performed by the "deflate" scheme. Furthermore, a "Content-Type" header describes "video/mp4" as the media type of the unsplit movie image data 131.

On the other hand, if the process advances from step S206 or 5209 to step S212, a response message containing the partial data extracted in step S204 is generated in step S212.

Since the media type of this partial data is not always the same as that of the movie image data 131, it is possible to, for example, restrict a media type to be used beforehand between the transmission side and reception side, or perform notification by using another header information.

In step S213, a response message transmission unit 109 transmits the response message generated in step S212 to the data reception apparatus 120. In step S214, the data reception apparatus 120 receives the response message transmitted from the data transmission apparatus 100.

In step S215, the data reception apparatus 120 determines whether the partial data in the received response message is compressed. If the partial data is compressed, the process advances to step S216; if not, the process advances to step S217.

In step S216, the data reception apparatus 120 decompresses the compressed partial data. In step S217, the data reception apparatus 120 obtains the information requested for the data transmission apparatus 100, by storing the partial data contained in the response message or the partial data decompressed in step S216 in an appropriate memory, or displaying either partial data on an appropriate display device.

In this embodiment as explained above, when acquiring partial data of a container type resource such as movie data on an apparatus, for example, a Web server, the partial data can be acquired by using a compression scheme suited to the data.

The compression effect increases especially when the partial data is described by a text such as the SRT form or 3GPP Timed Text form as the form of a subtitle track portion in movie image data. Since this decreases the data amount to be transmitted across a network, network traffic can be suppressed.

[Second Embodiment]

In the first embodiment, an example using the compression transmission scheme defined by the HTTP is explained. In this embodiment, an example corresponding to a binary XML format such as the "W3C EXI" format or "ISO Fast Infoset" format will be explained. Note that the configuration of the whole system of this embodiment is the same as that (FIG. 1) of the first embodiment. Only differences from the first embodiment will be explained below.

The binary XML format is a technique of compressing XML data, and an XML parser corresponding to this format makes it possible to analyze the compressed data. This obviates the need for the data decompressing process in steps S215 and S216 shown in FIG. 2B. Accordingly, the calculation time of data decompression in a data reception apparatus 120 shortens, and this effectively increases the speed of the whole data acquisition process.

Note that in this embodiment, the process of selecting a compression scheme explained in steps S208 and S210 in the flowchart shown in FIG. 2B is also different from that of the first embodiment.

In step S208, a compression scheme selection unit 106 determines a compression scheme processable by the data reception apparatus 120 by referring to the value of "Accept-Encoding" as the HTTP header of a request message, as in the first embodiment.

FIG. 8A shows an example of the request message received by a request message reception unit 101 by using the HTTP protocol, if the data reception apparatus 120 can process compression of the "EXI" and "Fast Infoset" formats.

Referring to FIG. 8A, "exi", "finf", and "deflate" are described as the value of "Accept-Encoding". This description indicates that the data reception apparatus 120 can process the "W3C EXI", "ISO Fast", "Inforset", and "deflate" schemes.

In step S210, the compression scheme selection unit 106 selects a compression scheme fitted to the codec type (identifier) acquired in step S207, from compression schemes processable by the data reception apparatus 120. As shown in FIG. 7, the compression scheme selection unit 106 holds a table registering a compression scheme (preferential compression scheme) and HTTP standard compression scheme suitable for each codec type.

Note that in FIG. 7, the above-described "FourCC" identifier is defined as the value of the codec type, "deflate", "gzip", and "identity (no compression)" are used as the values of normal compression schemes, and "exi" (the "W3C EXI" format) is defined as a preferential compression scheme.

Referring to FIG. 7, various codec types (identifiers) are registered in a field 701, compression schemes suited to these codec types are registered in a field 702, and HTTP standard compression schemes corresponding to the codec types are registered in a field 703. For example, according to the table shown in FIG. 7, when the codec type is "tx3g", a suitable compression scheme is "exi", and the HTTP standard compression schemes are "deflate" and "gzip". By referring to the table shown in FIG. 7, therefore, the compression scheme selection unit 106 first selects a preferential compression scheme corresponding to the codec type acquired in step S207. If the selected preferential compression scheme is a compression scheme processable by the data reception apparatus 120, the compression scheme selection unit 106 selects this preferential compression scheme as a compression scheme for transmission. On the other hand, if the selected preferential compression scheme is not processable, the compression scheme selection unit 106 selects a normal compression scheme corresponding to the codec type acquired in step S207 as a compression scheme for transmission.

For example, if the request message shown in FIG. 5A is received in step S202, the codec type of a subtitle track portion is "tx3g", so the compression scheme selection unit 106 first selects the compression scheme "exi" corresponding to "tx3g" from the table shown in FIG. 7. Then, the compression scheme selection unit 106 selects the selected compression scheme "exi" as a compression scheme for transmission, because the data reception apparatus 120 can process the "exi" scheme. FIG. 8B shows a configuration example of a response message generated by a response message generation unit 108 in this case.

A "Content-Range-Mapping" header is a header proposed by the specifications of the media fragment URI, and indicates that data contained in the response message is a portion of movie image data 131 split by the "track" splitting scheme.

Also, an "X-Content-Encoding" header indicates that HTTP compression is performed by the "exi" scheme. Since normal HTTP compression cannot describe the "exi" scheme, the "Content-Encoding" header of the HTTP is described as an extended header.

[Third Embodiment]

In the first embodiment, whether to compress split data is determined by the presence/absence of the use of a compression scheme (in the first embodiment, the "track" splitting scheme) having a compression effect. This embodiment has the feature that if a plurality of splitting schemes are designated as indicated by an URL 404 shown in FIG. 4, whether to perform compression is determined by combining the presence/absence of the use of a splitting scheme having a compression effect, and a data range (compression effective range) as a compression target. Accordingly, no data compression is performed if the size of the split data is small and the effect of reducing the size of transmission data is little. This achieves the effect of reducing the increase in CPU load and the delay of the transmission time caused by the data compression and decompression processes on the transmission side and reception side.

First, a functional configuration example of a system including a transmission apparatus according to this embodiment will be explained with reference to a block diagram shown in FIG. 9. Reference numerals 100 to 131 shown in FIG. 9 are the same as those shown in FIG. 1, so a repetitive explanation will be omitted. This embodiment differs from FIG. 1 in that a compression effective range acquisition unit 901 for acquiring the compression effective range is added to the apparatus.

Figure 10A:
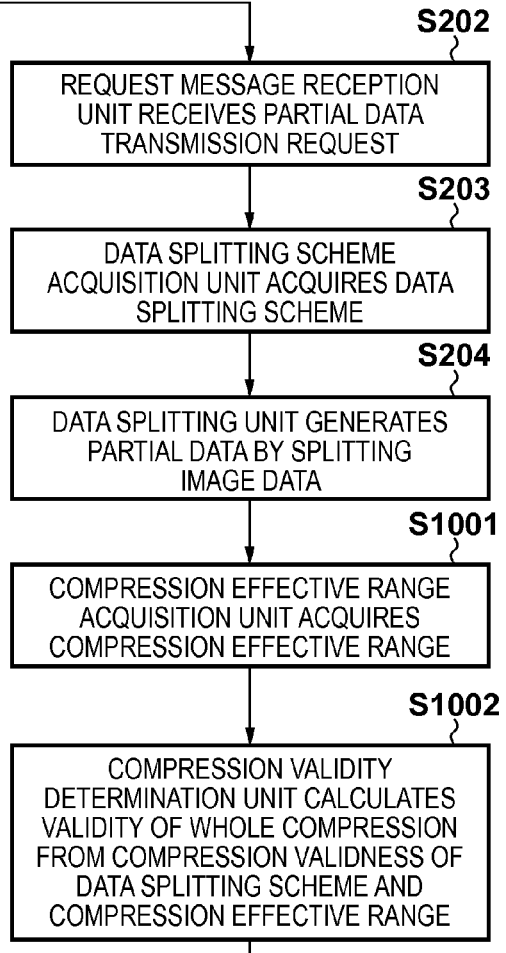
FIGS. 10A and 10B are flowcharts of processing performed by a data reception apparatus 120 and data transmission apparatus 100 of the third embodiment.
Figure 10B:
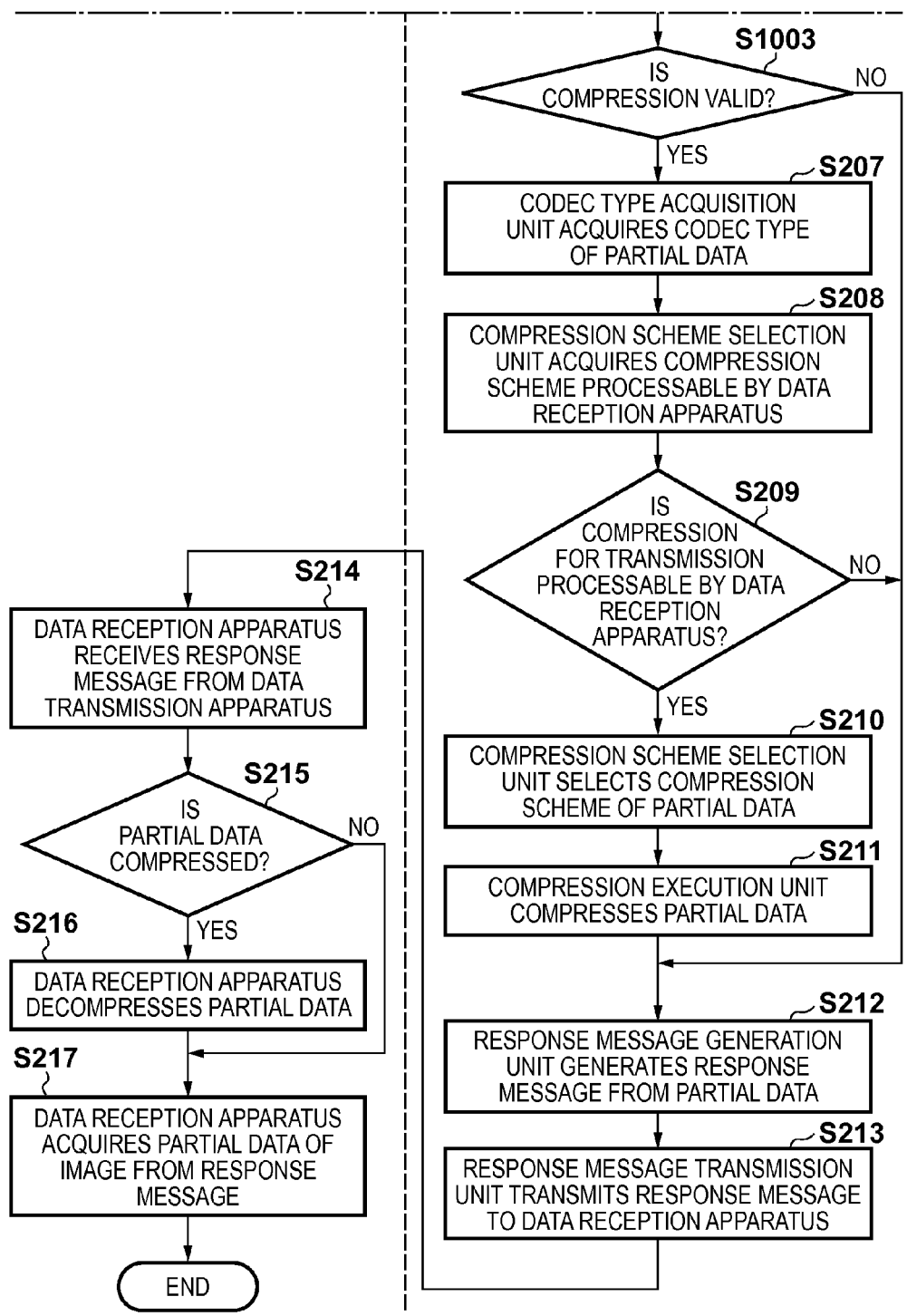

FIGS. 10A and 10B are flowcharts of the processing performed by the transmission apparatus according to this embodiment. Processes in steps S201 to S204 and S207 to S217 are the same as those shown in FIGS. 2A and 2B, so a repetitive explanation will be omitted.

After a data splitting unit 103 generates partial data in step S204, the compression effective range acquisition unit 901 calculates the value of the compression effective range in step S1001. Note that in this embodiment, a predicted value of the size of split data is used as the compression effective range. The size of split data is obtained from the size of unsplit data and a product (Π) of the size reduction ratios of individual splitting formats by Compression effective range=(size of unsplit data)×Π (data size reduction ratios of individual splitting schemes)

=(size of unsplit data)×(data size reduction ratio of "temporal" splitting scheme)×(data size reduction ratio of "spatial" splitting scheme)×(data size reduction ratio of "track" splitting scheme)

Also, in this embodiment, the reduction ratios of the individual splitting schemes are obtained by Data size reduction ratio of "temporal" splitting scheme=(reproduction time after splitting)÷(reproduction time before splitting)

Data size reduction ratio of "spatial" splitting scheme=(number of pixels after splitting)÷(number of pixels before splitting)

Data size reduction ratio of "track" splitting scheme=(number of tracks after splitting)÷(number of tracks before splitting)

Assume that the data size of unsplit data (example.mp4) is 100 MB, the reproduction time is 1,800 sec, the number of tracks is three, and the number of pixels is 640×360. In this case, the compression effective range when the media fragment URI described in the URL 404 shown in FIG. 4 is designated is obtained by Compression effective range=100MB×{(20−10)÷1800}×{(640×360)÷(640×360)}×{⅓}=0.19MB Then, in step S1002, a compression validity determination unit 104 calculates the compression validness of the data splitting scheme explained in the first embodiment, and a compression validness indicating the validity of compression from the compression effective range. In this embodiment, "the compression validness indicating the validity of compression from the compression effective range" is calculated by Compression validness=(compression validness of data splitting scheme)×(compression effective range)=1×0.19=0.19MB Note that the compression validness of the data splitting scheme is explained in the first embodiment, so a repetitive explanation will be omitted.

In step S1003, the compression validity determination unit 104 refers to the threshold of the compression validness preset in the transmission apparatus. If the compression validness is larger than the threshold, the compression validity determination unit 104 determines that the compression is valid, and the process advances to step S207. On the other hand, if the compression validness is equal to or smaller than the threshold, the compression validity determination unit 104 determines that the compression is invalid, and the process advances to step S212. For example, if the compression validness is 0.19 MB and the threshold is 1 MB, the split data is not compressed, and the process advances to step S212. Note that processing after that is the same as that of the first embodiment, so a repetitive explanation will be omitted.

In this embodiment, the data size reduction ratio is calculated by assuming that the compression ratio of a movie image is uniform at all times, in all regions, and on all tracks, and that the split range and data size are proportional. However, if a detailed reduction ratio of a movie image can be acquired, the calculation can also be performed by using the value. For example, let Ptemp(t) be the reduction ratio at a specific time, Ps(x,y,w,h,t) be the reduction ratio in a specific region, and Ptr(tr,t) be the reduction ratio on a specific track. In this case, the compression effective range can be obtained by Compression effective range=size of unsplit data×$\int_{t=ts}^{t=te}$Ptemp(t)Ps(x,y,w,h,t)Ptr(tr,t)dt where t: a variable indicating the specific time, ts: the start time of the partial data, te: the end time of the partial data, x: the x-coordinate of the partial data, y: the y-coordinate of the partial data, w: the width of the partial data, h: the height of the partial data, and tr: the track type of the partial data.

[Fourth Embodiment]

A data compression algorithm such as "deflate" can set the compression level for compression. Generally, the higher the compression level, the higher the compression ratio, but the longer the compression processing time.

In the processing in step S1003 of the third embodiment, the compression validity determination unit 104 determines whether to compress split data by using one threshold. In this embodiment, a compression validity determination unit 104 not only determines whether to perform compression, but also determines a compression level to be designated if compression is to be performed, by using a plurality of thresholds. Accordingly, when a compression execution unit 107 compresses split data in accordance with a compression scheme selected by a compression scheme selection unit 106, the compression process can be performed by a compression level matching the split data. That is, if the size of the split data is large, a compression level that raises the compression ratio is used to decrease the data size, thereby decreasing the communication load. If the size of the split data is small, a compression level that shortens the compression time can be used.

FIG. 11 shows an example of a compression level correspondence table indicating the correspondence between a plurality of thresholds and compression levels. A threshold corresponding to each compression validness is described in a compression validness field 1101. A compression level corresponding to each threshold is described in a compression level field 1102. The compression validity determination unit 104 refers to this compression level correspondence table in the processing in step S1003, and determines that compression is invalid if, for example, the compression validness is less than 1 MB. Also, the compression validity determination unit 104 determines to use compression level 4 if the compression validness is less than 10 MB, and determines to use compression level 9 if the compression validness is 10 MB or more. Note that this compression level correspondence table is held in a memory 111.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-282398 filed Dec. 17, 2010 and NO. 2011-251919 filed Nov. 17, 2011 which are hereby incorporated by reference herein in their entirety.

What is claimed is:

1. A transmission apparatus for transmitting data requested by an external apparatus to the external apparatus, comprising:
    a holding unit which holds, for each splitting scheme of extracting partial data from multimedia data, information indicating compression validness for data to be extracted by the splitting scheme;
    a reception unit which receives, from the external apparatus, a request message containing a first description defining a portion to be extracted from the multimedia data, and a second description defining a splitting scheme of extracting the portion;
    an extraction unit which extracts, from the multimedia data, the portion defined by the first description as partial data according to the splitting scheme defined by the second description contained in the request message;
    an acquisition unit which acquires, from said holding unit, the information corresponding to the splitting scheme defined by the second description;
    a determination unit which, on the basis of the information acquired by said acquisition unit, determines whether compression of the extracted partial data is valid; and
    a transmission unit which controls whether to compress the partial data in accordance with a determination result of said determination unit , and transmits one of the compressed partial data and uncompressed partial data obtained by the control to the external apparatus,
    wherein the splitting scheme defined by the second description contained in the request message is any one of a temporal splitting scheme for extracting a portion defined by a designated begin time and end time from the multimedia data being a movie, a spatial splitting scheme for extracting a region defined by designated coordinates and range from the multimedia data being the movie, and a track splitting scheme for extracting a subtitle track portion from the multimedia data being the movie, and
    wherein said determination unit determines that compression of the extracted partial data is valid, when the splitting scheme defined by the second description contained in the request message is the track splitting scheme.

2. The apparatus according to claim 1, wherein said determination unit determines whether a value corresponding to the acquired information is larger than a threshold,
    wherein said transmission unit transmits the compressed partial data obtained by compressing the partial data to the external apparatus, if said determination unit determines that the value is larger than the threshold, and
    transmits the partial data as the uncompressed partial data to the external apparatus, if said determination unit determines that the value is smaller than the threshold.

3. The apparatus according to claim 2, wherein
    the request message contains a third description defining a compression scheme processable by the external apparatus, and
    if said determination unit determines that the value is larger than the threshold, said transmission unit acquires a codec type of the partial data, acquires a compression scheme preset for the acquired codec type, compresses the partial data in accordance with the acquired compression scheme and the compression scheme defined by the third description, and transmits compressed data obtained by the compression to the external apparatus.

4. The apparatus according to claim 2, wherein if the second description defines not less than two splitting schemes, said acquisition unit acquires information corresponding to the not less than two splitting schemes from said holding unit, and said determination unit sets, as the value, a total sum of the information acquired for the not less than two splitting schemes by said acquisition unit, and determines whether the value is larger than the threshold.

5. The apparatus according to claim 4, further comprising a compression effective range acquisition unit which acquires a compression effective range after data is split, wherein said determination unit calculates, as the value, compression validness from the compression effective range acquired by said compression effective range acquisition unit, and the total sum of the information corresponding to the splitting schemes, and said transmission unit controls whether to compress the partial data in accordance with the calculated value, and transmits one of compressed partial data and uncompressed partial data obtained by the control to the external apparatus.

6. The apparatus according to claim 5, further comprising a unit which determines a compression level for compression based on the threshold.

7. The apparatus according to claim 1, wherein the information indicating compression validness for data to be extracted by the track splitting scheme is preset to indicate higher compression validness than compression validness for data to be extracted by the temporal splitting scheme and compression validness for data to be extracted by the spatial splitting scheme.

8. A non-transitory computer-readable storage medium storing a computer program for causing a computer to function as each unit of a transmission apparatus cited in claim 1.

9. A transmission method performed by a transmission apparatus which transmits data requested by an external apparatus to the external apparatus, and comprises a holding unit which holds, for each splitting scheme of extracting partial data from multimedia data, information indicating compression validness for the data to be extracted by the splitting scheme, comprising:

a step of causing a reception unit of the transmission apparatus to receive, from the external apparatus, a request message containing a first description defining a portion to be extracted from the multimedia data, and a second description defining a splitting scheme of extracting the portion;

a step of causing an extraction unit of the transmission apparatus to extract, from the multimedia data, the portion defined by the first description as partial data according to the splitting scheme defined by the second description contained in the request message;

an acquisition step of causing an acquisition unit of the transmission apparatus to acquire, from the holding unit, the information corresponding to the splitting scheme defined by the second description;

a determination step which, on the basis of the information acquired in said acquiring step, determines whether compression of the extracted partial data is valid; and a transmission step of causing a transmission unit of the transmission apparatus to control whether to compress the partial data in accordance with a determination result of said determination step , and transmit one of the compressed partial data and uncompressed partial data obtained by the control to the external apparatus, wherein the splitting scheme defined by the second description contained in the request message is any one of a temporal splitting scheme for extracting a portion defined by a designated begin time and end time from the multimedia data being a movie, a spatial splitting scheme for extracting a region defined by designated coordinates and range from the multimedia data being the movie, and a track splitting scheme for extracting a subtitle track portion from the multimedia data being the movie, and wherein said determination step determines that compression of the extracted partial data is valid, when the splitting scheme defined by the second description contained in the request message is the track splitting scheme.

10. The method according to claim 9, wherein said determination step of causing a determination unit of the transmission apparatus to determine whether a value corresponding to the acquired information is larger than a threshold, wherein the transmission step includes a step of transmitting the compressed partial data obtained by compressing the partial data to the external apparatus, if said determination step determines that the value is larger than the threshold, and transmitting the partial data as the uncompressed partial data to the external apparatus, if said determination step determines that the value is smaller than the threshold.

* * * * *